US010173744B2

(12) United States Patent
Bales

(10) Patent No.: US 10,173,744 B2
(45) Date of Patent: Jan. 8, 2019

(54) BICYCLE STABILIZER DEVICES AND METHODS OF STABILIZING A BICYCLE

(71) Applicant: Jeffrey M. Bales, Sandpoint, ID (US)

(72) Inventor: Jeffrey M. Bales, Sandpoint, ID (US)

( * ) Notice: Subject to any disclaimer, the term of this patent is extended or adjusted under 35 U.S.C. 154(b) by 50 days.

(21) Appl. No.: 15/284,878

(22) Filed: Oct. 4, 2016

(65) Prior Publication Data

US 2017/0096183 A1 Apr. 6, 2017

Related U.S. Application Data

(60) Provisional application No. 62/237,219, filed on Oct. 5, 2015.

(51) Int. Cl.
*B62K 21/10* (2006.01)
*E05B 75/00* (2006.01)
*B62H 1/00* (2006.01)

(52) U.S. Cl.
CPC .............. *B62K 21/10* (2013.01); *B62H 1/00* (2013.01); *E05B 75/00* (2013.01); *E05B 75/005* (2013.01)

(58) Field of Classification Search
CPC ........... B62K 21/10; B62H 1/00; E05B 75/00; E05B 75/005
See application file for complete search history.

(56) References Cited

U.S. PATENT DOCUMENTS

| | | | | |
|---|---|---|---|---|
| 565,718 A * | 8/1896 | Boardman | ............ | B62K 21/10 280/271 |
| 608,539 A * | 8/1898 | Barto | ..................... | B62K 21/10 280/271 |
| 615,961 A * | 12/1898 | Doyle | ................... | B62K 21/08 280/272 |
| 863,567 A * | 8/1907 | Brierley | ................ | B62K 21/10 280/271 |
| 1,230,801 A * | 6/1917 | Schriver | ................ | B62K 21/10 280/271 |
| 2,087,535 A * | 7/1937 | Dall | ....................... | B62K 21/10 280/272 |
| 4,006,915 A * | 2/1977 | Parker | .................... | B62K 21/10 280/271 |
| 4,558,878 A * | 12/1985 | Motrenec | ............... | B62K 21/08 188/317 |
| 5,383,676 A * | 1/1995 | Valentino | ............... | B62K 21/10 280/250 |
| 7,082,701 B2 | 8/2006 | Dalgaard et al. | | |
| 7,306,248 B2 * | 12/2007 | Gogo | .................... | B62K 21/08 280/272 |
| 7,950,112 B2 | 5/2011 | Hammerslag et al. | | |
| (Continued) | | | | |

*Primary Examiner* — Joseph M Rocca
*Assistant Examiner* — Marlon A Arce
(74) *Attorney, Agent, or Firm* — Wells St. John P.S.

(57) ABSTRACT

A bicycle stabilizer device includes a first post attached to a handlebar stem of a bicycle and a second post attached to upper frame portion of the bicycle; and a stabilizer bar configured to be reversibly connected between the first and second posts. Stabilizing a bicycle includes providing a stabilizer bar comprising a front portion end and a rear portion, attaching the second end to an upper portion of a bicycle frame. A post is disposed along a handlebar stem of the bicycle. The first end of the bar is reversibly connected to the post, the reversibly connecting stabilizing a front wheel of the bicycle to remain in a forward position.

10 Claims, 11 Drawing Sheets

(56) References Cited

U.S. PATENT DOCUMENTS

2005/0151341 A1* 7/2005 Iwamoto ............... B62K 21/08
                                                    280/272
2005/0236791 A1* 10/2005 Carr ..................... B62K 5/027
                                                    280/92

* cited by examiner

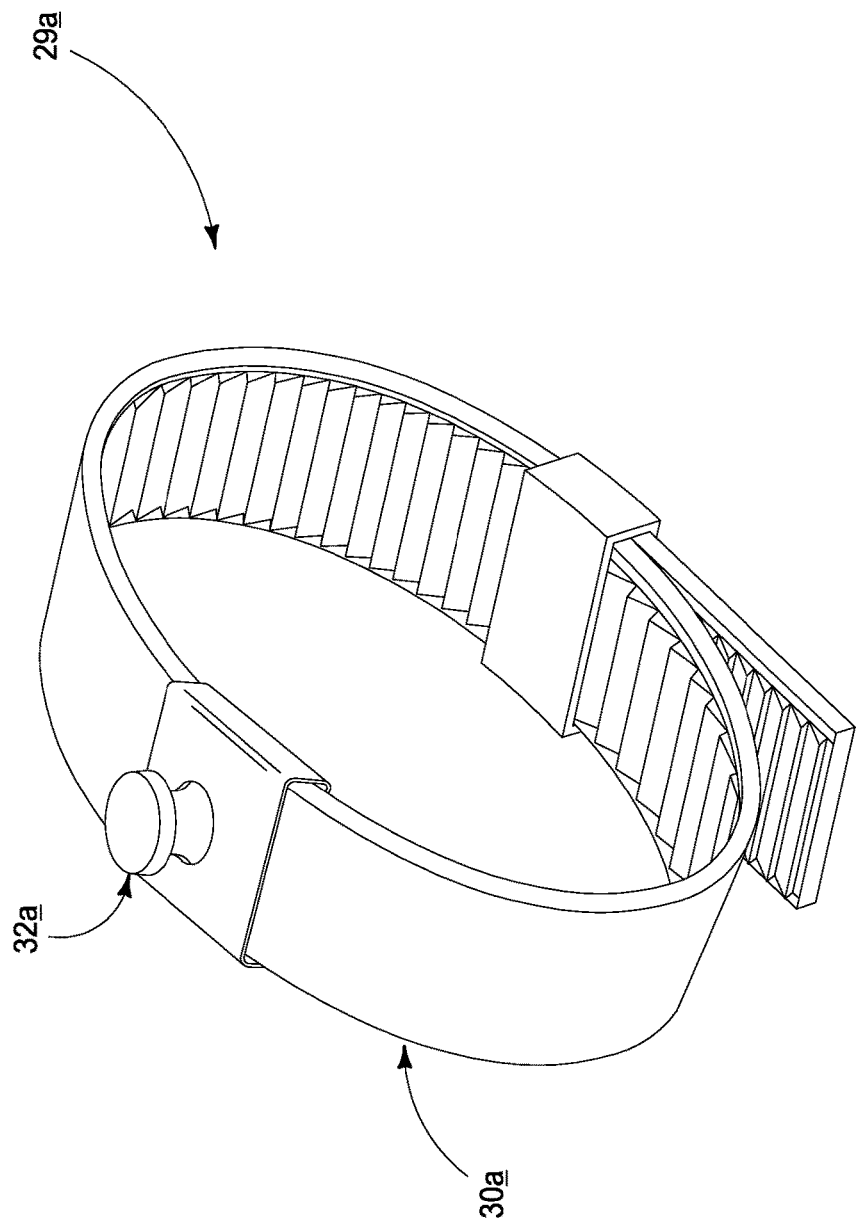

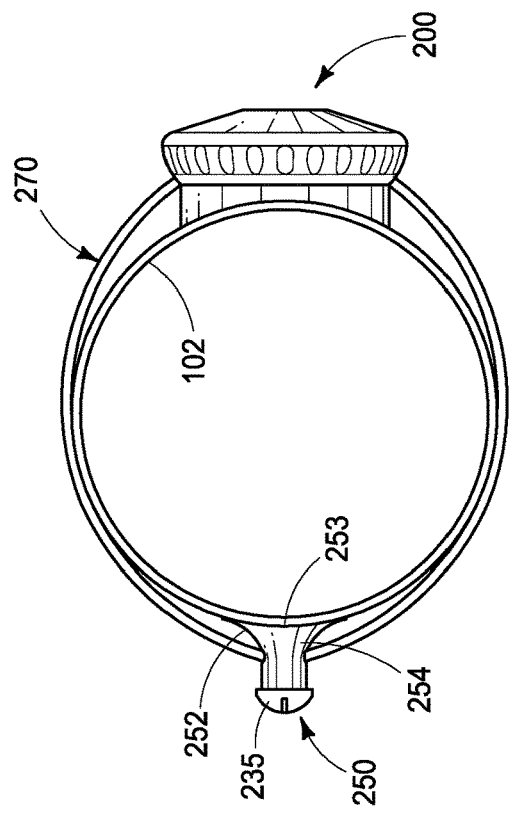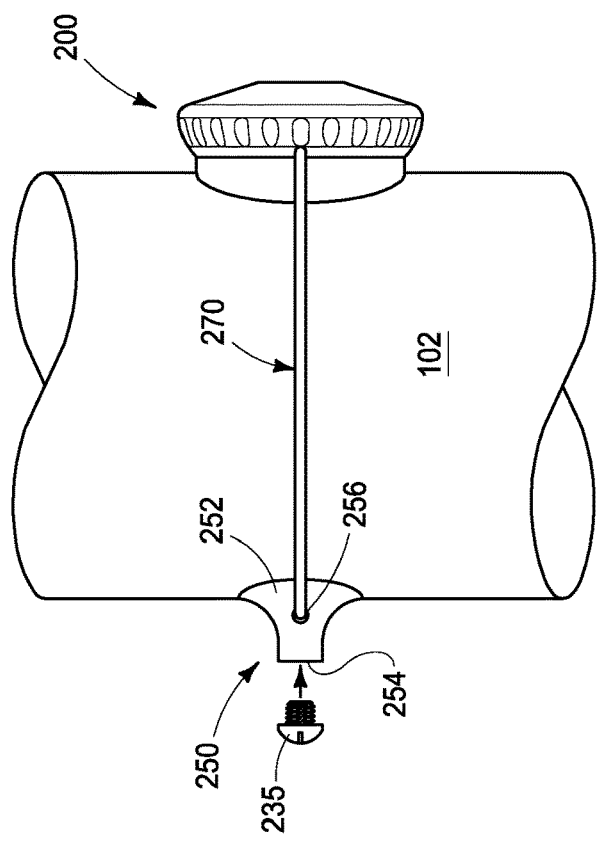

BICYCLE STABILIZER DEVICES AND METHODS OF STABILIZING A BICYCLE

RELATED PATENT DATA

This application claims priority to U.S. Provisional Patent Application Ser. No. 62/237,219, which was filed on Oct. 5, 2015, the disclosure of which is incorporated herein by reference.

TECHNICAL FIELD

The invention pertains to bicycle stabilizing devices and methods of stabilizing bicycles.

BACKGROUND

Bicycles typically have a front wheel and handle bar portion that is freely pivotable for steering the bicycle. However, the free movement of the front wheel and handle bars can render it difficult to park the bicycle upright, push the bicycle or change a tire on the bicycle or perform other repairs. Further, since the front wheel and handle bars can rotate upon lifting, the acts of carrying the bicycle, mounting the bicycle on a rack or carrier, or hanging the bicycle for storage can be difficult. Conventional apparatuses for stabilizing a bicycle for repairs can be bulky and inconvenient for use remotely. It would be desirable to develop devices and methods for stabilizing a bicycle.

BRIEF DESCRIPTION OF THE DRAWINGS

FIG. 5B shows an alternate view of the component depicted in FIG. 5B.

FIG. 9 A-B shows components of the embodiment depicted in FIG. 8 in conjunction with a portion of a bicycle.

DETAILED DESCRIPTION OF EXAMPLE EMBODIMENTS

Figure 1:
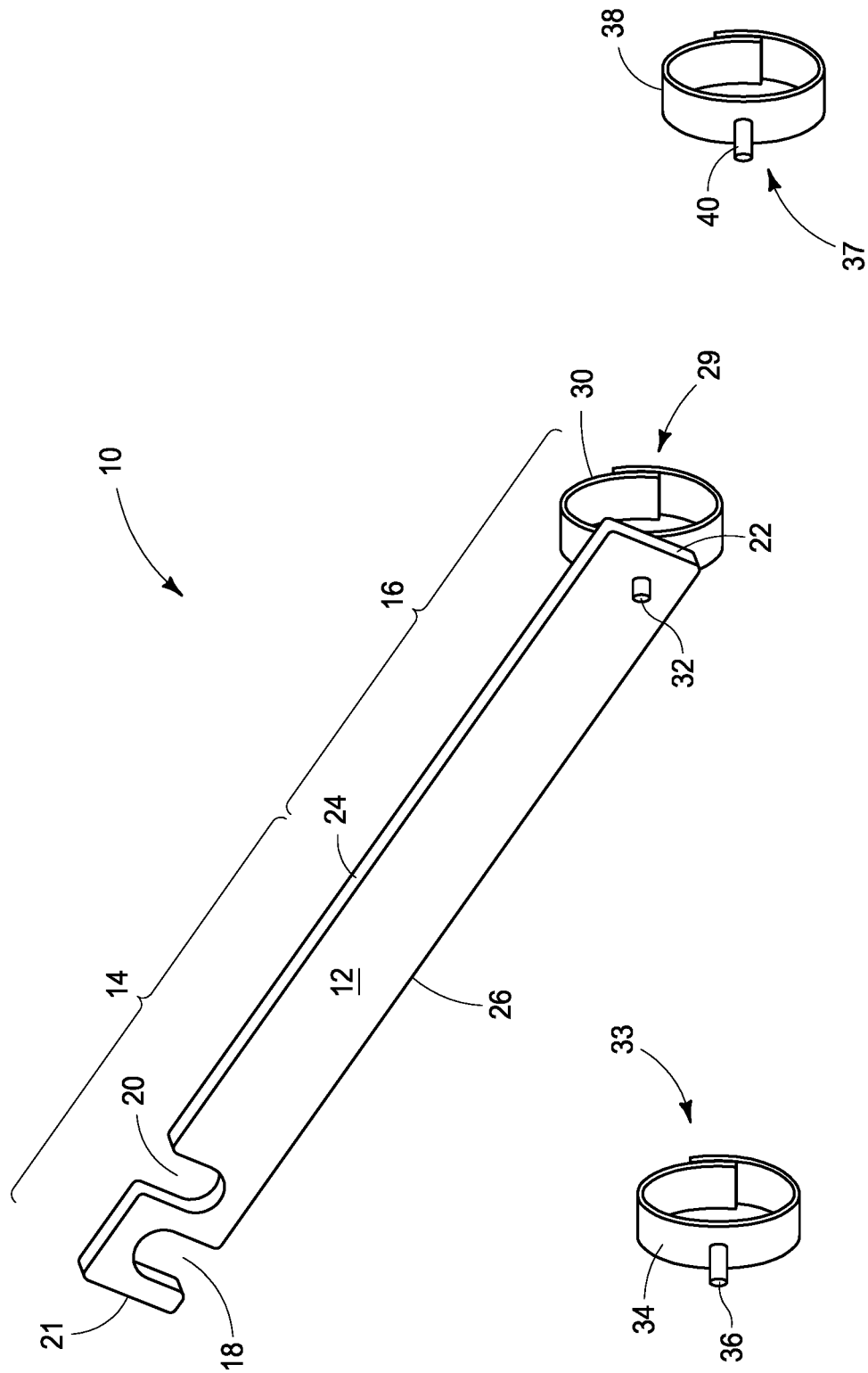
FIG. 1 depicts a bicycle stabilizer device in accordance with one aspect of the invention.

Apparatuses and methods for stabilizing a bicycle are described generally with reference to FIGS. 1-7. Referring initially to FIG. 1, a bicycle stabilizer device 10 is illustrated. The device can comprise interactive components including a stabilizer bar 12 and a plurality of attachment components 29, 33, 37.

Stabilizer bar 12 can be described as having a front portion 14 and a rear portion 16, and having a front edge 21, a back edge 22 opposing the front edge 21, a top edge 24 and a bottom edge 26 that opposes the top edge. It is noted that the described edges (top, bottom) and portions of bar 12 (front, back) are assigned based upon the positioning of the bar as depicted in FIG. 1. For ease of description, these terms will be utilized consistently throughout the description regardless of alternative positioning of the stabilizer bar in other figures.

The shape and dimensions of stabilizer bar 12 are not limited to particular configurations. In FIG. 1, bar 12 is shown as being flat. However, bar 12 can alternatively be a rod (square, round, rectangular, polygonal, etc.).

Figure 2:
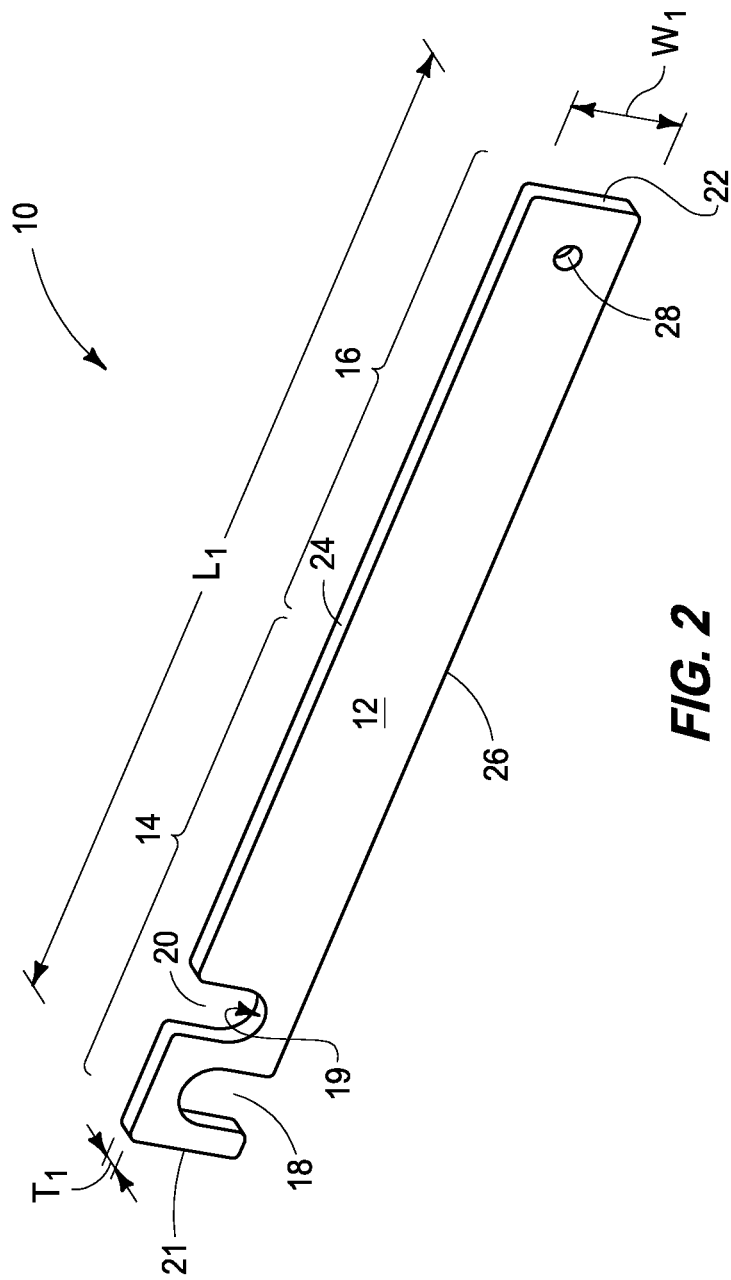
FIG. 2 illustrates an example component of the device illustrated in FIG. 1.

FIG. 2 depicts an example stabilizer bar 12 according to one embodiment of the invention. The length $L_1$, width $W_1$, and thickness $T_1$ of stabilizer bar 12 can vary and can depend upon particular applications. For example, the length $L_1$ of stabilizer bar 12 can vary depending upon a size of a bicycle (child's vs. adult), the size and style of a bicycle frame, and/or the angle of an upper portion of a bicycle frame (horizontal vs. sloped). In most instances, the length $L_1$ of stabilizer bar 12 will be from 3.0 inches to 12.0 inches, and in particular instances can preferably be 8.0 inches.

Because the strength of the stabilizer bar can depend upon the width $W_1$ and thickness $T_1$, these parameters can depend, at least in part, upon the material utilized for formation of stabilizer bar 12. Typically, the width $W_1$ of stabilizer bar 12 can be from 0.25 inches to 2.0 inches. In particular instances, stabilizer bar 12 can preferably have a thickness of 0.75 inches. The thickness $T_1$ of stabilizer bar 12 can be, for example, from 0.0626 inches to 1.0 inches.

Stabilizer bar 12 can be fabricated from any of a number of materials including but not limited to a metal or metal alloy (aluminum, titanium, copper, brass), plastic, nylon, wood, carbon fiber, or a combination thereof. Further, the stabilizer bar can be coated (not shown) with, for example, a rubberized material, a plastic material, paint or an anodized material. In some applications, it can be advantageous to provide coating on the stabilizer bar to protect the bar and/or surfaces of the bicycle. In some embodiments, coating the bar can provide a tighter fit and/or increased friction for retaining the bar notches (discussed below) on mounting pins.

As shown in FIG. 2, stabilizer bar 12 can comprise a first notch 18 extending inward from bottom edge 26 in front portion 14 of the bar. Stabilizer bar 12 can additionally comprise a second notch 20 extending inward from top edge 24 at a second location in the front portion 14 of the bar. The relative location of the first and second notches is not limited to the configuration shown. For example, the distance from the front edge of bar 12 can be greater than or less than that shown and/or the spacing between the first notch and the second notch can be greater than or less than that shown. Additionally, the order of the notches can be reversed such that second notch 20 is more proximal front edge 21 than first notch 18. The size the two notches can differ and can vary in various embodiments of the invention (discussed below).

Notches 18 and 20 can be rounded or curved along bottom surfaces 17 and 19 as depicted in FIG. 2. Alternative notch shapes can also be utilized including but not limited to tapered, squared, etc. Further, notches 18 and 20 can differ in shape and size relative to one another. Depths of notches 18 and 20 can be, for example, from 0.125 inches to 1.75 inches, and can depend, at least in part, upon width $W_1$ of the stabilizer bar. Notches 18 and 20 can have equivalent widths or can have differing widths relative to each other. The widths of notches 18 and 20 can be, for example, from 0.05 inches to 1.0 inches. In particular applications, notches 18 and 20 can be identical in shape and size, having rounded bottom surfaces 17, 19, and having widths of 0.17 inches and depths of 0.5 inches.

Stabilizer bar 12 can also comprise an opening 28 that extends entirely through the thickness $T_1$ of the bar within rear portion 16. The configuration of opening 28 is more fully described below.

Figure 3A:
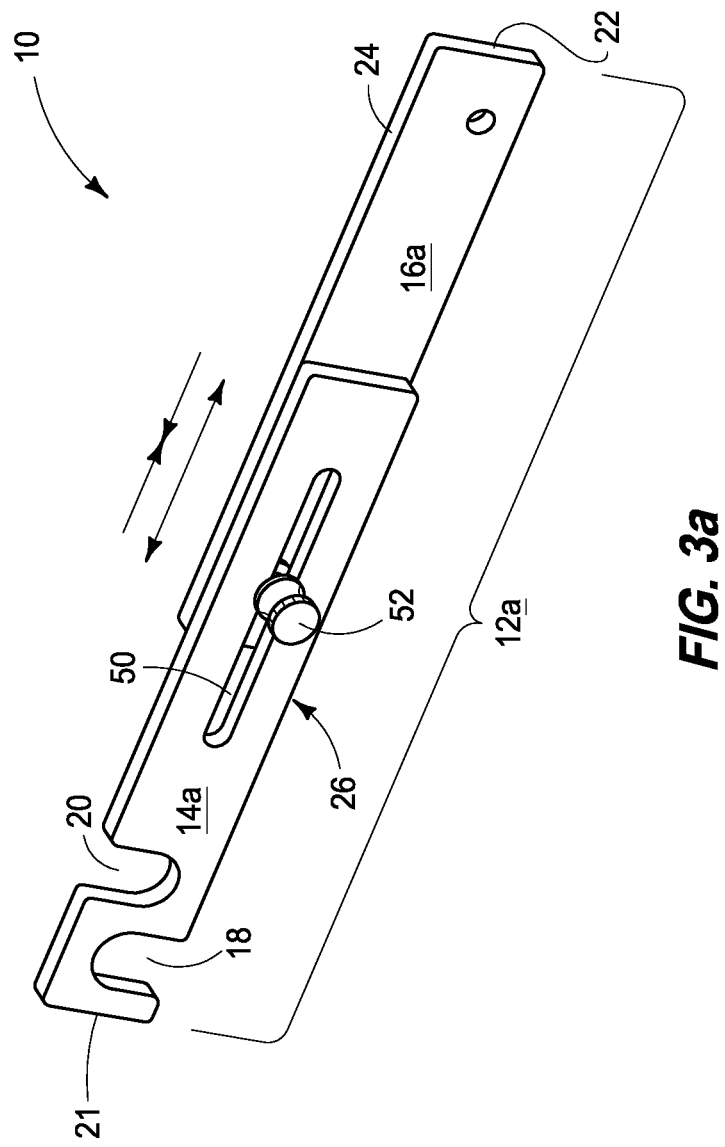
FIG. 3A shows an alternative embodiment of the component depicted in FIG. 2.

With reference to FIG. 3A, an alternative configuration of a stabilizer bar 12a is depicted. Various aspects of bar 12a can be identical to those described above. Those features are assigned numeric identifiers identical to those presented in the earlier figures. Features that are present in the earlier figures but can differ in the embodiment depicted in FIG. 3 are assigned the same numeric identifier as assigned earlier with the appendage "a". New features are assigned unique numeric identifiers.

The embodiment of stabilizer bar 12a shown in FIG. 3 has an adjustable bar length. Preferably, stabilizer bar 12a can have an adjustable length within, or at least partially within, the length range set forth above with respect to FIG. 2 ($L_1$).

In the embodiment shown in FIG. 3A, stabilizer bar 12a has a two-part configuration with front portion 14a being a separate piece from rear portion 16a. Portions 14a and 16a can overlap one another as shown or rear portion 16a can be on the opposite face of front portion 14a (not shown). In the configuration depicted in FIG. 3A, front portion 14a has a slot 50 through which a set screw 52, or alternate fastener can pass. Set screw 52 can extend into a threaded opening within rear portion 16a. the length of stabilizer bar 12a can be adjusted as desired by loosening the set screw, sliding the front and rear portions relative to one another, and tightening the set screw to maintain the bar at the desired length.

Figure 3B:
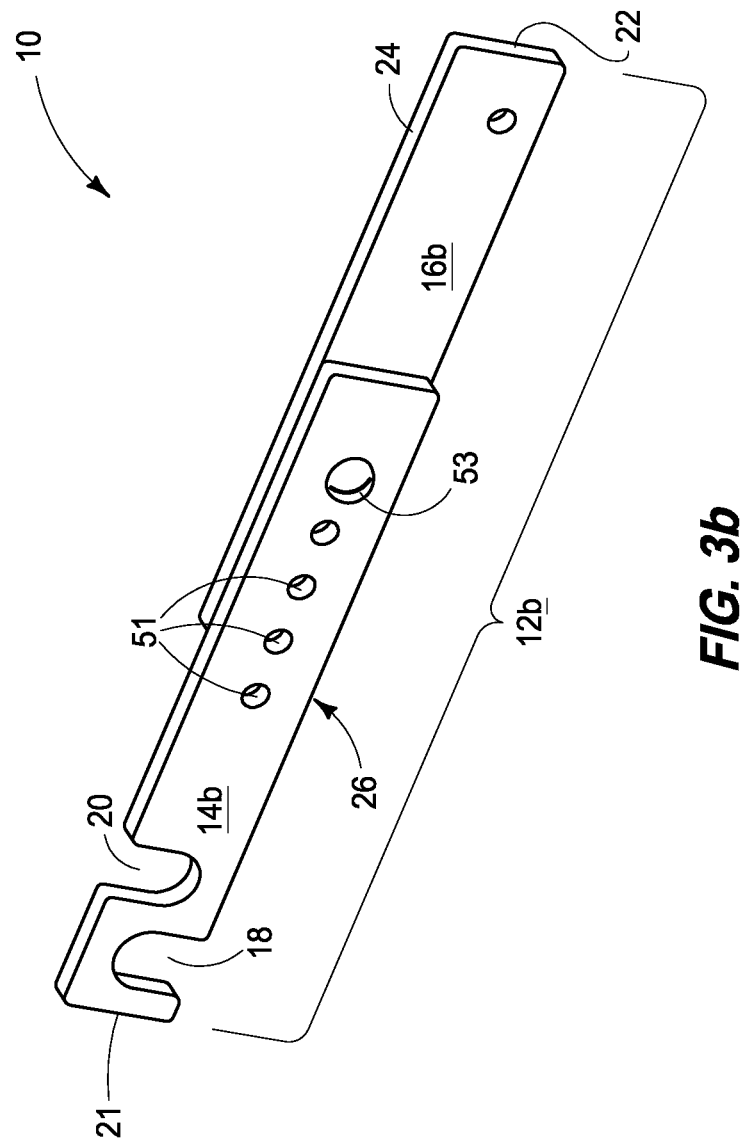
FIG. 3B shows a modification of the component depicted in FIG. 3A.

FIG. 3B shows an alternative adjustable stabilizer bar 12b configuration. Front portion 14b can comprise a plurality of openings 51. Rear portion 16b can have one or more bolts that can be inserted into appropriate of the openings 51 and the two portions can be maintained in position by placing nuts on the bolts (not shown). Alternatively, one or more bolts 53 can be passed through openings 51 and can be threadably retained within corresponding threaded openings in rear portion 16b. It is to be understood that the invention contemplates alternative configurations of adjustment of stabilizer bar length relative to those depicted in FIGS. 3A and 3B.

Referring again to FIG. 1, the plurality of attachment components can include at least two attachment components 29, 33. A first attachment component 29 can be associated with rear portion 16 or stabilizer bar 12, and a second attachment component 33 can be associated with front portion 14 of the stabilizer bar when the stabilizer bar is in use. In preferred embodiments, the plurality of attachment components can additionally include a third attachment component 37 that is associated with the front portion 14 of the stabilizer bar when the bar is not in use (bar storage position, discussed below).

Each of the attachment components 29, 33, 37, can comprise an attachment band 30, 34, 38, and a post 32, 36, 40 attached to and extending outward from the corresponding attachment band. The attachment bands can be referred to as a first band 30, a second band 34 and a third band 38, corresponding to first, second and third attachment components. The corresponding posts can be referred to as a first post 32, a second post 36 and a third post 40.

Figure 4:
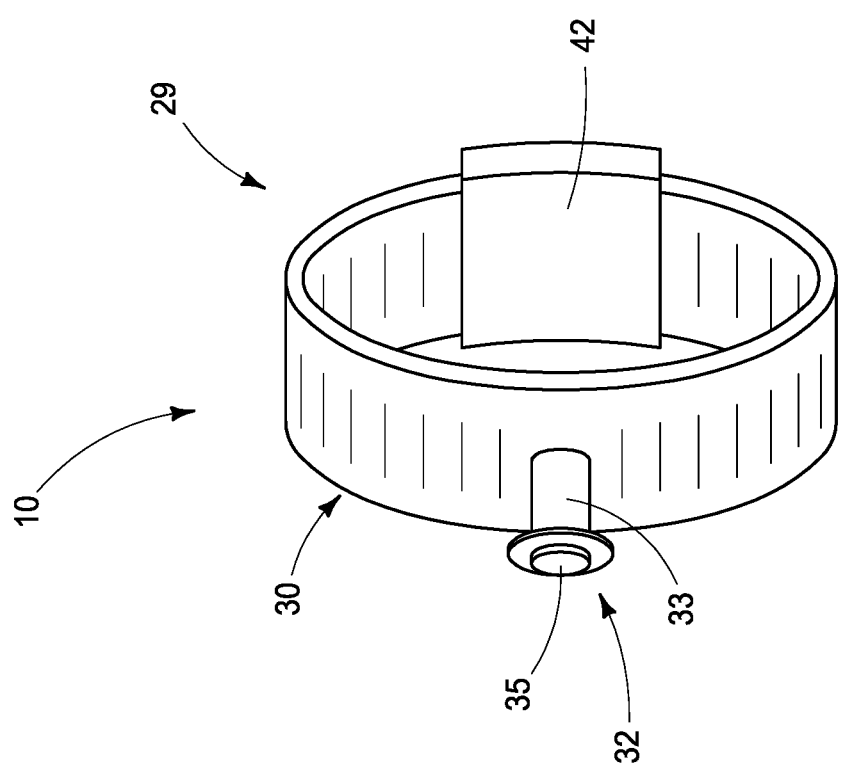
FIG. 4 shows an example of another component of the device shown in FIG. 1.

The bands of the attachment components can be configured to encircle various portions of a bicycle. First band 30 and third band 38 can be configured to encircle an upper portion of a bicycle frame (see FIG. 5) and second band 34 can be configured to encircle a handle bar stem (FIG. 4). Each of the bands can be configured to fit securely to a particular portion of the bicycle. Accordingly, the bands can vary in size and in particular embodiments can differ in size relative to each other. FIG. 1 shows one example of a type of band (ratchet band) that can be utilized as part of the attachment components. Additional example band types that can be utilized in conjunction with various aspects of the invention are discussed below.

Referring again to FIG. 2, such shows additional aspects of stabilizer bar 12. Stabilizer bar 12 can comprise an opening 28 that extends entirely through the thickness of the bar within rear portion 16. Such configuration allows first post 32 of first attachment component 29 to be inserted entirely through the rear portion of the bar as depicted in FIG. 1 such that bar 12 remains secured to attachment device 29. Opening 28 is of sufficient diameter to allow bar 12 to rotate around the second post. Therefore, the diameter of opening 28 can vary depending upon the particular configuration of first attachment device 29, and particularly with respect to the size of first post 32. The distance of opening 28 from rear edge 22 is not limited to a particular value. Preferably, opening 28 is sufficiently close to edge 22 to avoid interference of rotation of bar 12 around the first post.

FIG. 4 shows an example configuration of an attachment device in accordance with the invention. The depicted attachment device can be first device 29. First band 30 is shown as being a ratchet clamp type band similar to a hose clamp. Alternative band configurations can be utilized including but not limited to the solid style band depicted in FIG. 1, a cable, a wire, a cable tie, buckle strap, etc. Where a ratchet type band is utilized, the band can be tightened to mount onto a bicycle with an appropriate ratchet type tightener 42. The particular style of ratchet band and tightener utilized can be any available conventional or yet to be developed configurations. Where band 30 is a solid type band, the band can have abutting edges or overlapping edges that can be joined by, for example, pins, screws, bolts, etc.

The lengths and widths of bands 30, 34 and 38 are not limited to particular values. The lengths and widths of each of the bands can be independently selected. The length of each of the bands can depend upon the portion of the bicycle frame that it encircles and can be, for example, from 2 inches to 12 inches (for example 9.0 inches). The band widths and thicknesses can depend upon the strength of the strength of material utilized. The widths of the bands can be from 0.05 to 2.0 inches (for example 0.75 inches). The band thickness can be from 0.05 inches to 0.25 inches (for example 0.05 inches).

First post 32 shown in FIG. 4 comprises a head portion 35 and a stem portion 33 that extends between band 30 and head portion 33. It can be preferable that post 32 comprise a head portion to retain bar 20 on the post. It is to be understood that alternative post styles are contemplated. In the configuration shown in FIG. 4, post 32 can be affixed to band 30 by passing through the band. Example attachment of post 32 to band 30 can be threading, rivet attachment, bolt, weld, etc., or use of a weld nut. One or more washers may be utilized, as appropriate, between surface(s) of the band and the post device.

The length and diameter of stem portion 33 of post 32 can be configured for proper insertion through opening 28 and rotation of bar 12. Head portion 28 can be provided to be of sufficient size to prevent bar 12 from sliding off post 32.

Post 32 is not limited to a particular post configuration and can comprise for example, a pin, bolt screw, rivet, etc.

Example post configurations can be bolts or screws with thumbnuts, acorn nuts, or weld nuts. The shape of the head portion is not limited and can be, for example, flat, rounded, square, polygonal, rectangular, etc., or can alternatively be a clip that can be attached to the stem portion by insertion into a groove provided along the stem portion (not shown).

It is to be understood that the invention contemplates embodiments where post 32 (as well as the second and/or third posts) is attached to or integral with the bike frame utilizing an alternate attachment configuration (not shown). For example, post 32 can be directly attached to the frame by welding, embedding, or any other direct attachment, or can be formed as an integral part of the frame.

Second attachment devices 33 and 37 can be of the same configuration as first device 29 or can be different from device 29 and/or each other. Devices 33 and 37 can have any of the band and post configurations described with respect to device 29. In particular aspects, second post 36 and third post 40 can be provided to have stems without head portions although it can be preferable to include head portions in certain aspects to prevent bar 12 from sliding off the post upon which it has been positioned (see below). Although post 32 is preferably round to allow rotation of the bar, any of the posts can independently have an alternative shape including but not limited to square, polygonal or rectangular. Head portions can be detachable or integral with the stem portions of the posts.

The materials utilized for attachment devices (bands and posts) can be independently selected from a variety of materials. Example materials include but are not limited to various metals, alloys, metal compositions, composite, nylon and plastics. The band can also be made from materials such as leather or rubber.

Figure 5A:
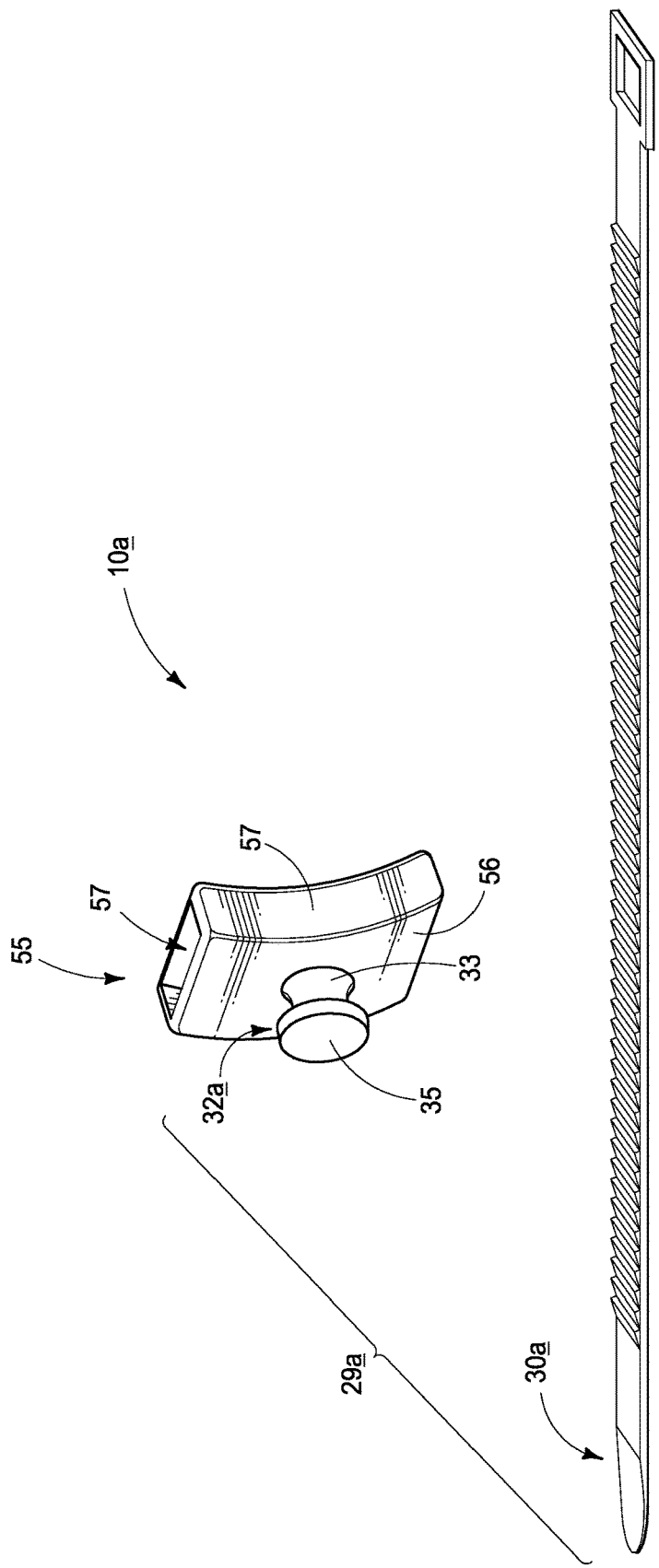
FIG. 5A shows an alternative example of the component depicted in FIG. 4.

Another example attachment device in accordance with the invention is illustrated in FIGS. 5A and 5B. An example attachment component 29a is shown having a unitary mounting structure 55 with an integral post 32a. Structure 55 can be formed by, for example 3D printing or molding (e.g. injection molding). Preferred materials for structure 55 can be printable or moldable plastics. Post 32a can have stem 33 and head 35 portions having sizes and shapes as set forth above with respect to FIGS. 1 and 4.

Mounting structure 55 can have a body portion 56 having an opening 57 passing laterally therethrough. A band 30a, such as the depicted zip-type cable tie depicted for example, can be inserted through opening 57 as shown in FIG. 5B. The dimensions of opening 57 can be configured as appropriate for passing band 30a, through the opening for securing the mounting structure to the bicycle frame. It is to be understood that the mounting structure can be utilized with any of the band configurations discussed above.

Figure 6:
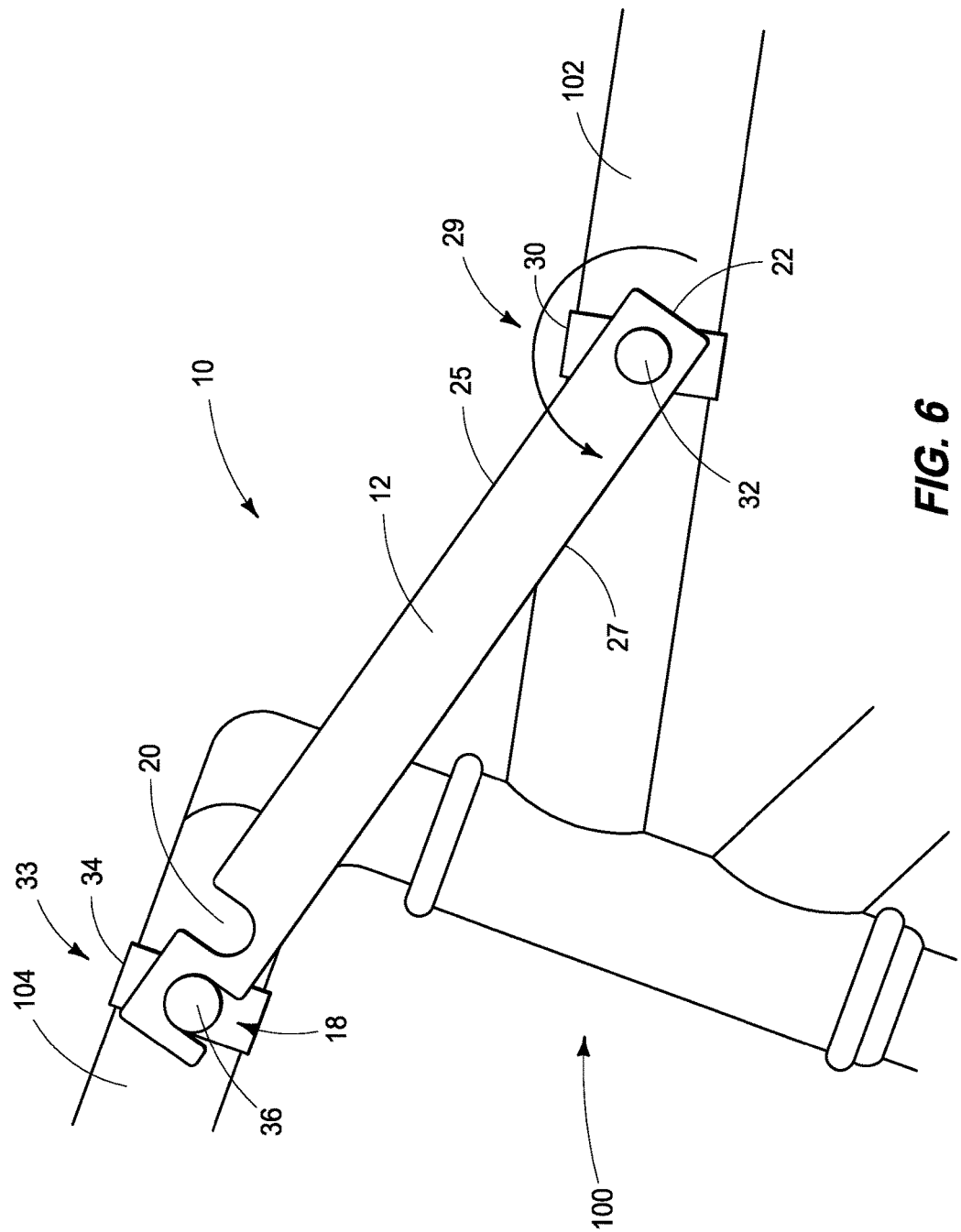
FIG. 6 illustrates the device shown in FIG. 1 in conjunction with a bicycle in a stabilized position.

With reference to FIG. 6, device 10 is illustrated in conjunction with a bicycle 100. The stabilizer device is shown mounted to the bicycle with the device being in a stabilizing position. As illustrated, first attachment device 29 is mounted along an upper frame portion 102 of bicycle 100. Second attachment device 33 is mounted along a handlebar stem 104. In the stabilizing position, bar 12 can have first notch 18 over second post 36 such that bar 12 immobilizes the handlebars of bicycle 100 to prevent pivoting. First and second attachment devices can be positioned along the respective frame portions to allow rotation of bar 12 and insertion of pin 36 into notch 18. With stabilizer device 10 in the stabilizing position as shown in FIG. 6, the bicycle can be stabilized for easier parking, repair, maintenance, carrying, pushing, mounting, transporting on a vehicle, etc.

The stabilizer device 10 shown in FIG. 6 can be repositioned into a non-stabilizing position by rotation of bar 12 to no longer engage post 36 within notch 18 (clockwise rotation in FIG. 6). Once the post is disengaged, the handlebar is once again freely pivotable.

Figure 7:
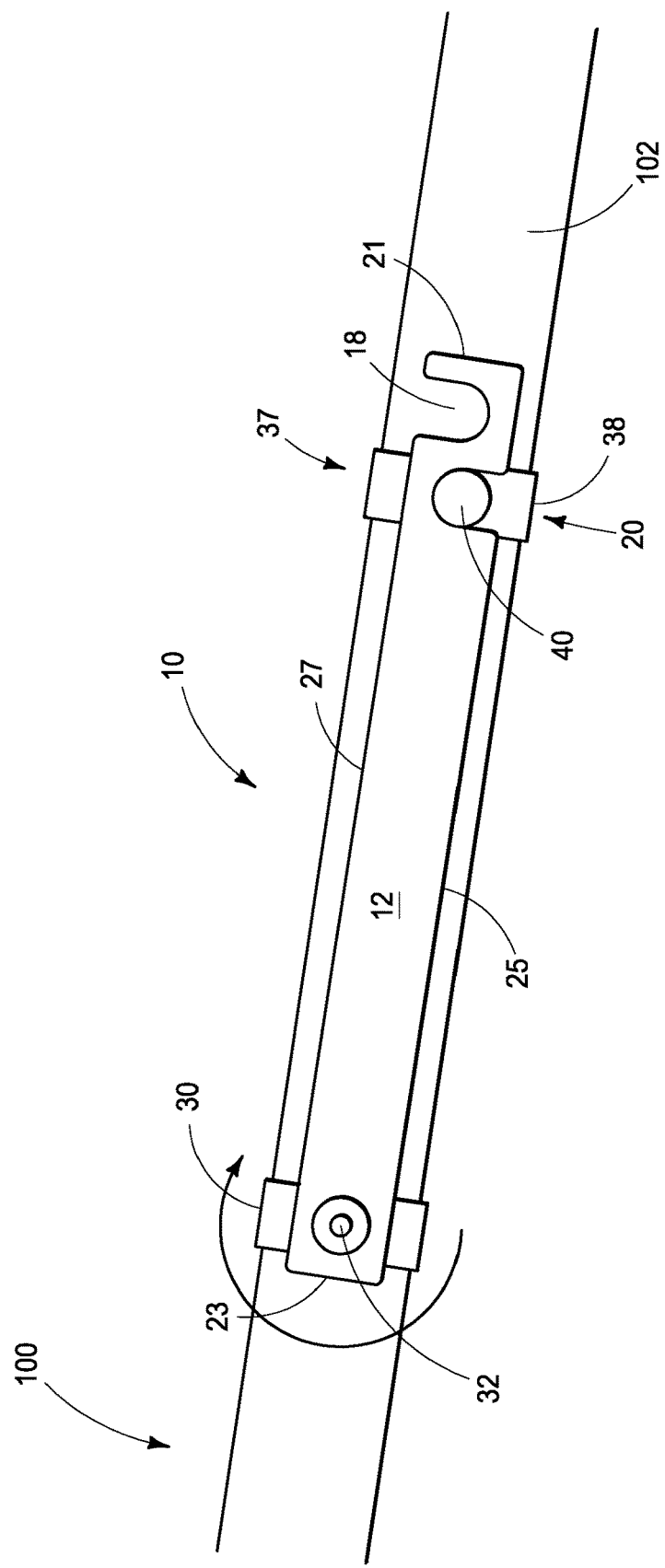
FIG. 7 illustrates the device shown in FIG. 1 shown in conjunction with a bicycle in a non-stabilized position, with the device in a storage configuration.

FIG. 7 depicts device 10 in a non-stabilizing position (bar storage position). In FIG. 7, post 36 does not engage notch 18. In particular embodiments, third attachment device 37 can be mounted along frame portion 102 at a position along the frame more proximate a bicycle seat than first attachment device 29. Attachment device 37 can be positioned at an appropriate distance from device 29 to allow engagement of the second notch 20 of bar 12 with third post 40 of the third attachment device. Such positioning can allow bar 12 to be held in a "stored" position while not in use for stabilizing the bicycle. When stabilization is desired, bar 12 can be rotated from the stored position shown in FIG. 5, to the stabilizing position in FIG. 4 (counter-clockwise in the figures).

As mentioned above, the stabilizing bar can preferably have sufficient thickness relative to the posts to provide a friction fit between the post heads and the strap. Additionally, the notches in the stabilizing bar can be shaped to enhance friction. In embodiments where the bands comprise ladder straps having raised surfaces, the raised surfaces can also enhance the friction fit further stabilizing the bar in a desired position. In particular applications, coating on the bar can also advantageously provide friction between the bar and contacting surfaces.

Methods of stabilizing a bicycle encompassed by the invention can comprise providing first attachment device 29 along upper frame portion 102 of bicycle 100. Second attachment device 33 can be provided along stem portion 104 of the bicycle. The method can include positioning of devices 29 and 33 at an appropriate spacing to allow first notch 18 of bar 12 to engage post 36 of attachment device and thus stabilize the bicycle. Stabilizer bar 12 can be rotated counterclockwise to engage post 36 to stabilize the bicycle.

The methods can further include providing a third attachment device 37 along the upper frame portion 102 position behind first attachment device 29 (more proximate the seat). When stabilization is no longer desired, stabilizer bar can be rotated clockwise to disengage post 36. Clockwise rotation of bar 12 can also engage post 40 into second notch 20 for securing bar 12 in the bar storage position. The methods can utilize attachment devices and stabilizer bars having any of the configurations discussed above.

Referring to FIG. 8, components of an alternative attachment device are depicted as encompassed by an alternative embodiment of the invention. An example ratchet/dial (reel) type tightener 200 is illustrated in FIGS. 8A and 8B. The tightener can preferably comprise a dial/ratchet portion 210 attached to a base 220. Base 220 has a curved mounting surface 222 that interfaces with a frame portion of a bicycle (see FIG. 9). The dial/Ratchet portion 210 and the base portion 220 can be integral or can be connected individual parts. Example ratchet/dial type tightener portions include ATOP® (Chen, Kevin Taichung City TAIWAN) and BOA® (Boa Technology, Inc. Denver COLORADO) devices. Other ratchet/dial and reel-type devices are contemplated.

Figure 8B:
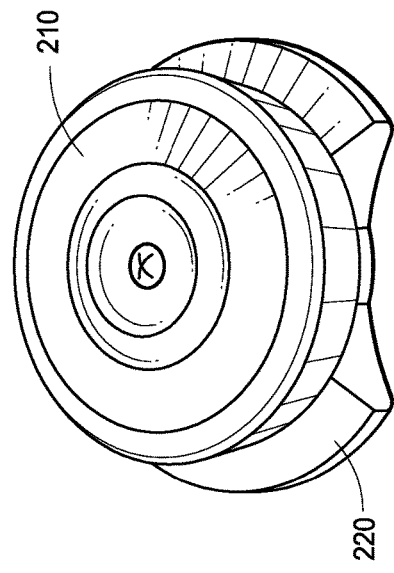
FIG. 8 A-D shows components of a device in accordance with another aspect of the invention.
Figure 8D:
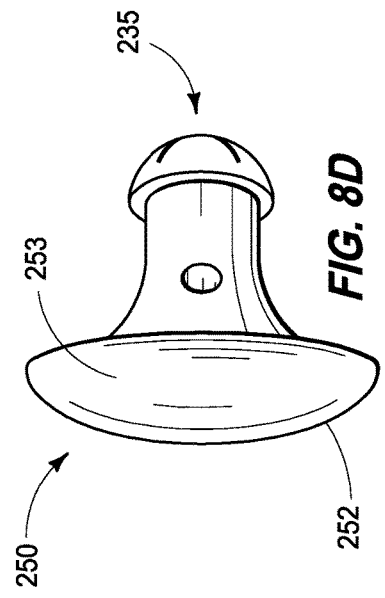
Figure 8A:
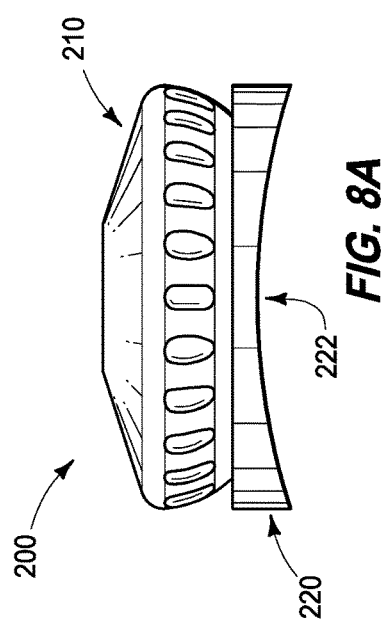
Figure 8C:
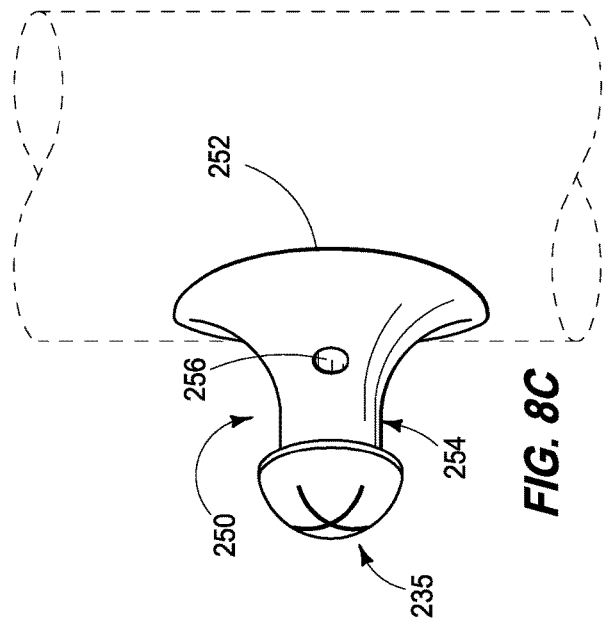

An example of an attachment device mounting post component 250 is illustrated in FIGS. 8C-8D. The post component can be configured to have a post stem 254, a head 235 portion and a base 252. An opening 256 is provided that passes through post 254. In particular aspects, head 235 can be removable. For example, post 254 can comprise internal threads as depicted (see FIG. 9) such that head 235 (e.g. comprised by a bolt) can be reversibly threaded into the post stem. Other configures of removable head portions are contemplated. Alternatively, head portion 235 can be integral with stem 254 (not shown). Base 252 preferably has a curved surface 253 that can interface with a portion of a bicycle frame (see FIG. 9). A The components depicted in FIG. 8 can be configured to attached to a bicycle frame 102 and interact as illustrated in FIG. 9. As shown, tightener portion 200 can be mounted on frame 102 (or handle bar stem) in an opposing position relative to post component 250. A connector cable 270 can be passed from the dial/ratchet and can be threaded through opening 256 of post 254. The dial/ratchet can be utilized to tighten the cable to securely hold post component 250 on the bicycle frame. One or more ratchet type devices such as those illustrated can be utilized together with a stabilizer bar as described above to stabilize and/or immobilize the front portion of a bicycle.

The post and ratchet components depicted in FIGS. 8-9 can each be formed from a variety of materials including but not limited to plastics, metals and combinations thereof. Cable 270 can be, for example, metal or nylon cable/thread. Methods of utilizing the embodiment of FIGS. 8-9 can be analogous to those set forth above with respect to the previously described embodiments. Components of the described embodiments can be interchangeable or combined. For example, a stabilizer device in accordance with the invention can optionally use a first type of attachment device on the handle bar stem and a second type of attachment device on the frame.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

What is claimed is:

1. A bicycle stabilizer device comprising:
    a first attachment band configured to be secured around a handlebar stem of a bicycle;
    a first post attached to the first attachment band;
    a second attachment band configured to be secured around an upper frame portion of the bicycle;
    a second post attached to the second attachment band; and
    a bar configured to extend from the first post to the second post, each of the first and second posts extending through the bar.

2. The device of claim 1 wherein the bar comprises a rear portion and a forward portion, and comprises an opening through the rear portion, and wherein the second post passes through the opening with the bar being rotatable around the second post.

3. The device of claim 2 wherein the bar comprises a lower edge with a notch disposed through the lower edge within the forward portion, the notch being configured to receive the first post.

4. The device of claim 2 further comprising a third attachment band comprising a third post connected to the third attachment band.

5. The device of claim 4 wherein the notch is a first notch and wherein the bar comprises a second notch disposed through an upper edge within the forward portion.

6. The device of claim 5 wherein the third attachment band is configured to attach along the upper frame portion at a point more proximate a seat of the bicycle than the first attachment band.

7. A method of stabilizing a bicycle comprising:
    providing a stabilizer bar comprising a front portion end and a rear portion end;
    attaching the rear portion end to an upper portion of a bicycle frame by providing a first attachment band on the upper portion of the frame with a first post connected to the first attachment band and passing through a rear portion of the stabilizer bar;
    providing a second post disposed along a handlebar stem of the bicycle; and
    engaging the front portion end of the bar onto the post such that the post extends through the bar to stabilize a front wheel of the bicycle to remain in a forward position.

8. The method of claim 7 wherein the engaging comprises entering the first post into a notch through a lower edge of a front portion of the stabilizer bar.

9. A system for stabilizing a bicycle comprising:
    a first attachment component secured around a handlebar stem of a bicycle, the first attachment component comprising a first band having a first post attached thereto;
    a second attachment component secured around an upper portion of the bicycle frame, the second attachment component comprising a second attachment band having a second post attached thereto;
    a bar attached to the second post and configured to rotate about the second post to allow the first post to engage a first notch in the bar.

10. The system of claim 9 further comprising a third attachment component comprising a third post, the bar comprising a second notch through an upper edge within a forward portion of the bar, the second notch being configured to receive the third post in a non-stabilizing position.

* * * * *

UNITED STATES PATENT AND TRADEMARK OFFICE
CERTIFICATE OF CORRECTION

PATENT NO. : 10,173,744 B2  
APPLICATION NO. : 15/284878  
DATED : January 8, 2019  
INVENTOR(S) : Jeffrey M. Bales Page 1 of 1

It is certified that error appears in the above-identified patent and that said Letters Patent is hereby corrected as shown below:

In the Specification

Column 2, Line 55 - Replace "The size the" with --The size of the--

Column 7, Line 7 - Replace "(see Fig. 9). A" with --(see FIG. 9).--

Signed and Sealed this  
Nineteenth Day of March, 2019

Andrei Iancu  
*Director of the United States Patent and Trademark Office*